Oct. 1, 1963
R. L. KIMBER, JR
3,105,714
HANDLE-BAND ASSEMBLY
Filed May 8, 1961
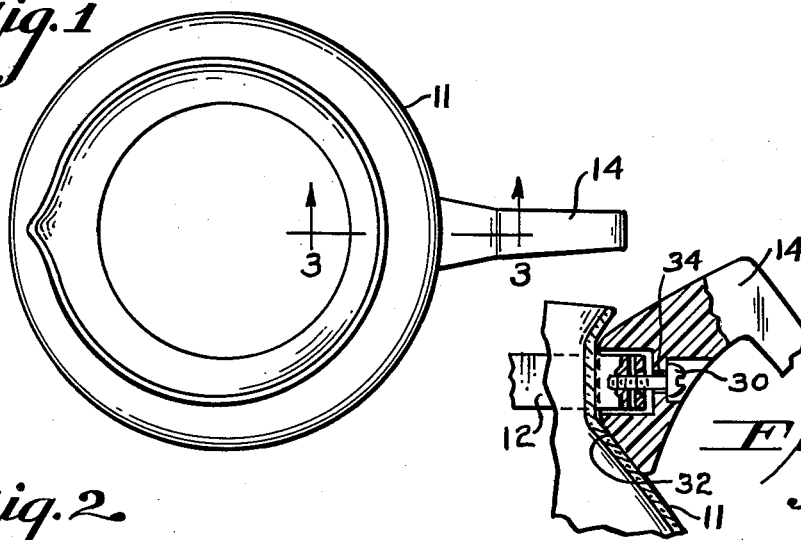
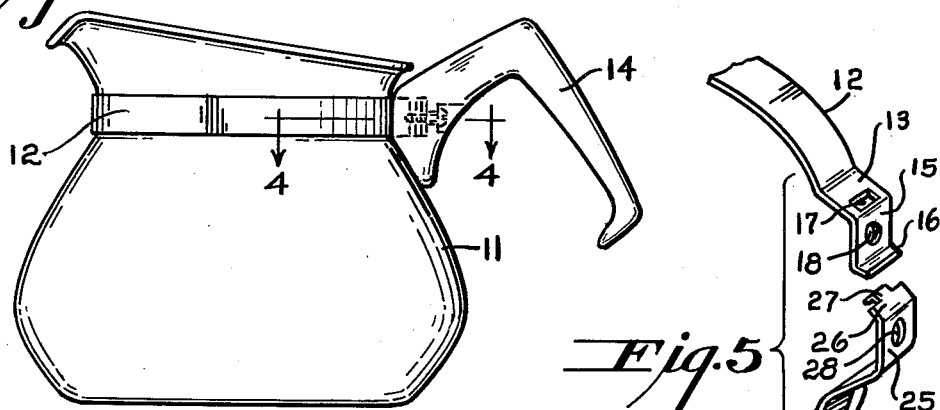
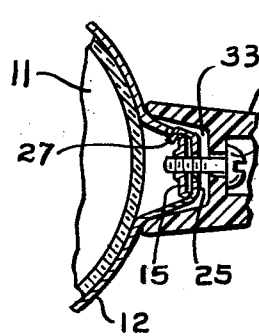
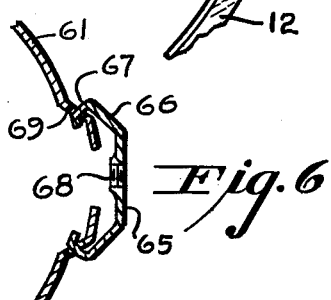
INVENTOR.
RAY L. KIMBER JR.
BY
Clarence R. Patty, Jr.
ATTORNEY

United States Patent Office 3,105,714
Patented Oct. 1, 1963

3,105,714
HANDLE-BAND ASSEMBLY
Ray L. Kimber, Jr., Painted Post, N.Y., assignor to Corning Glass Works, Corning, N.Y., a corporation of New York
Filed May 8, 1961, Ser. No. 108,405
2 Claims. (Cl. 294—31.2)

The present invention relates to utensil assemblies most commonly employed for culinary purposes such as teapots and the like and particularly to a handle and band assembly especially suited for a utensil made of vitreous material such as glass or the like, although equally applicable to utensils made of other materials.

The primary object of the invention is to provide an extremely simple and inexpensive assembly that can very easily be attached to and detached from a utensil.

Another object of the invention is a structural arrangement wherein by means of a single fastener the band may be held tightly about the utensil and the handle firmly held against the side wall thereof even though the circumferential distance about the utensil occupied by the band may be considerably less than the average for which the band length has been calculated.

According to the invention a relatively thin, flexible band preferably composed of resilient material is employed. Such band closely surrounds the utensil except in the region to be occupied by the handle where its ends are bent outwardly approximately 35° from a line passing through the handle and the band center. Such ends in a subsequent region are bent inwardly into parallelism and overlap one another. The overlapping band end has the marginal end portion bent inwardly about 35° to bring its outer surface substantially coextensive with the outer surface of the portion of the other end of the band bent outwardly 35° and is provided with a hook projectable into an aperture in such other end of the band when the same is placed around a utensil to which the handle is to be attached. Aligned holes in the overlapped end portions of the band are provided for receipt of a handle attaching screw. The overlapping portion tapers inwardly about the border of the hole therein which is of a diameter to freely receive the screw whereas the size of the hole in the overlapped portion and hole surrounding portion are formed to serve as a self-threading nut. The marginal portion of the end of the overlapped portion of the band is bent at a 90° angle in a direction to face its end edge toward the overlapping portion of the band. The bends in the marginal portions of the band ends impart rigidity thereto and to such overlapped portions of the band.

The handle is shaped to simply follow the profile of the utensil wall for a distance below the band, and in the part of its wall facing portion opposite the band, has a pocket whose opening faces the utensil and into which the bent out portions of the band project. Such pocket is of such depth that band portions immediately adjacent its entrance may be drawn thereinto by a screw passed through the bottom of such pocket and threaded through the holes in the band ends to thus tighten the band about the utensil while drawing the handle toward the utensil and its pocket border tightly up against the band.

Alternatively, according to the invention, the band is made in two parts, one part of which comprises a strap having both ends apertured. The other part is arranged to bridge the ends of the strap and is provided with hooks at its opposite ends for introduction into such apertures. The band part having the hooks is provided with an aperture intermediate its ends into which the screw is threaded to clamp a handle to the band and to tighten the band about the utensil.

For a more detailed description of the invention reference will hereinafter be made to the accompanying drawing in which:

FIG. 1 is a top plan view of a handled utensil embodying the invention.

FIG. 2 is a side elevational view of the same.

FIG. 3 is a fragmentary view taken on line 3—3 of FIG. 1.

FIG. 4 is a fragmentary view taken on line 4—4 of FIG. 2.

FIG. 5 is a perspective view of the end portions of the band embodied in the invention.

FIG. 6 is a sectional view of a fragment of an alternative form of band embodying the invention.

Referring to the drawing in detail, the reference numeral 11 designates a typical form of utensil for use of a band and handle embodying the invention.

The utensil neck is surrounded by a band 12 having end portions each of which may be said to comprise three parts somewhat similar to one another. The one end has a portion 13 extending outwardly approximately 35° from a line passing through the band ends and the axial center of the band when encircled about the utensil, a portion 15 that extends inwardly from portion 13 in a plane normal to such line and an end marginal portion 16 extending outwardly from portion 15 in a direction that the included angle between it and portion 15 is approximately 90°, or in a plane parallel to such line. The other end of the band has portions 23 and 25 corresponding to band end portions 13 and 15 and an end marginal portion 26 that differs from the portion 16 in that it extends inwardly at an angle to bring it into parallelism with portion 13 and to lap portion 26 slightly over portion 13 when portion 25 is arranged in overlapping relation with portion 15. When such portions are so overlapped, as is done when the band is wrapped around a utensil such as 11 preparatory to attachment of the handle thereto, a hook 27 projecting from portion 26 projects into a rectangular hole 17 in portion 13 to hold the band 11 encircled about the utensil and to bring into axial alignment holes 18 and 28 passing through band portions 15 and 25 respectively. The diameter of hole 28 is such as to readily permit the free passage of the threaded stem of a holding screw 30 therethrough and the hole bordering region of portion 25 is tapered to facilitate ready introduction of the screw thereinto. The diameter of hole 18 and the shape of the hole bordering region of portion 15 form a bounded open portion such as to serve as a threaded nut-like means for screw 30 as is common practice.

A handle 14 has an end 32 shaped to conform to the shape of the utensil and has a pocket 33 therein whose entrance faces the utensil and into which the overlapped band ends project. A hole 34 through the portion of the handle forming the bottom of pocket 33 is in alignment with the aligned holes 28 and 18 in the band ends and enables the screw 30 to be readily passed through holes 34 and 28 and threaded into the hole 18. As will be readily apparent, as the screw advances through hole 18 the band, because of its flexibility, is readily drawn deeper into pocket 33 and becomes tightened about the utensil. At the same time the pocket entrance bordering portion of the handle is brought tightly against the band to rigidly associate it therewith while bringing the handle into close proximity to the utensil, so that any material movement of the utensil relative to the handle when filled and supported by the handle is positively prevented by engagement with the utensil of that portion of the handle adjacent thereto and occupying the region below the band.

In the showing of FIG. 6 one part of the band comprises a strap 61 each end of which is alike and has an aperture such as 69 similar to aperture 17 of band 12. The other part of such band comprises a strap end bridging member embodying a portion 65, similar to portion 25 of band 12, having a screw threaded aperture 68 between portions such as 66 and 67 that are similar to portions 26 and 27 of band 12. As will be seen when the ends of strap 61 are linked to one another by the bridging member sufficient space remains between the strap ends for the passage of the stem of the clamping screw 30 therebetween. The manner of assembly of a handle to a utensil using the form of band shown in FIG. 6 will be obvious and need not be described.

What is claimed is:

1. In combination with a culinary utensil an improved easily mountable handle and band assembly firmly secured about the utensil which comprises, a relatively thin flexible band of resilient material circumscribing an annular portion of the utensil, each end of said band having an integrally-formed planar portion radially offset by an angularly-extending connecting portion, one of said integral planar portions having bounded open portion means formed therein for threadably receiving a screw fastener, and the other of said planar portions having a hole therein for freely passing such screw fastener therethrough, an aperture formed in one of said connecting portions, a projecting hook extending from an end portion of the band opposite said one connecting portion positionable within said aperture to hold the end portions of the band together with said planar portions in overlapping relationship and with the hole and bounded open portion means in axial alignment, a shaped handle having a pocket formed therein with an opening facing the utensil for receiving said overlapped end portions, an opening in said handle communicating with said pocket in alignment with said axially aligned hole and bounded open portion means, and a screw fastener projecting through said opening and said hole into said bounded open portion means to draw the band deeper into said pocket and firmly tighten and lock the band and handle on the utensil.

2. A handle and band assembly for use in combination with a vessel such as a teapot and the like for providing a firmly secured handle means to such vessel which comprises, a flexible band of resilient material readily conformable to encircle a portion of the vessel, said band being of unitary construction and having offset nut-like means formed integrally therewith adjacent one end for threadably receiving a threaded fastener, an aperture formed through an outwardly-expanded portion of said band adjacent said nut-like means, a relatively planar offset portion adjacent the opposite end of said band having an open portion extending therethrough, a hook projecting from the opposite end portion through said aperture to hold the end portions of the band together with said relatively planar offset portion overlying said nut-like means in substantial parallelism so that the open portion in the former is in axial alignment with a hole in the latter, a handle having a contoured vessel-contacting face with a recess formed therein to receive said hooked overlying end portions of said band, an opening in said handle communicating with said recess, and a threaded fastener having a head abutting a portion of said handle and extending through said opening and said open portion and threadably engaging said nut-like means to firmly secure said handle and said band on the vessel.

References Cited in the file of this patent

UNITED STATES PATENTS

| | | |
|---|---|---|
| 2,886,366 | White | May 12, 1959 |
| 2,932,982 | Enders | Apr. 19, 1960 |

FOREIGN PATENTS

| | | |
|---|---|---|
| 5,808 | Great Britain | of 1914 |